J. H. CARR.
FLYING MACHINE.
APPLICATION FILED JAN. 3, 1919.
1,349,942.
Patented Aug. 17, 1920.
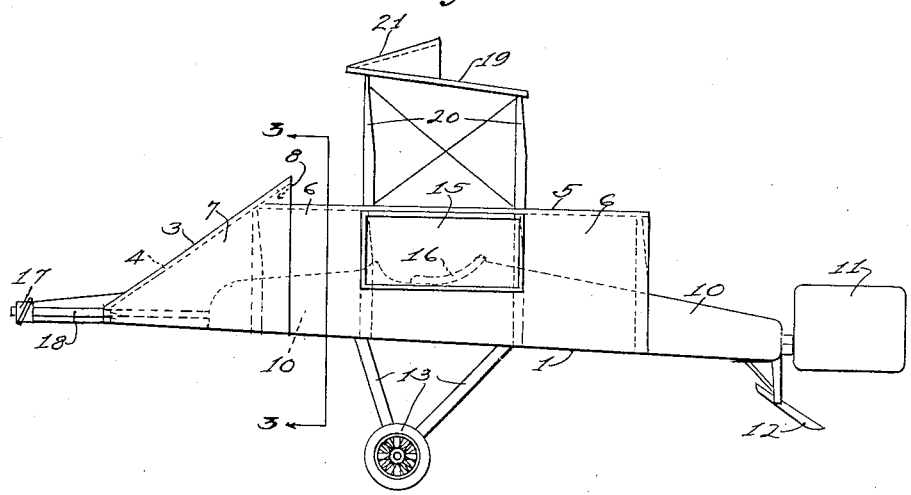
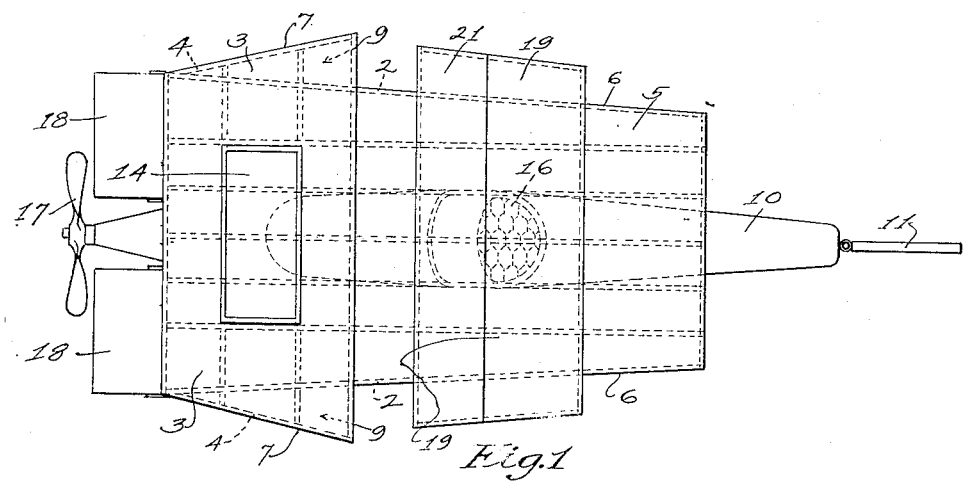
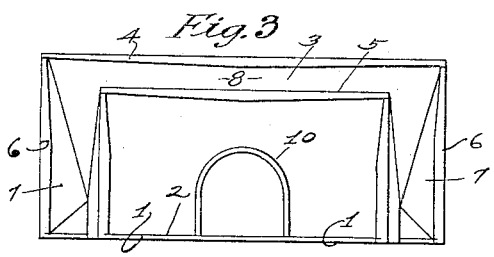
INVENTOR:
John H. Carr,
By
Mack & Litzenberg
Attorneys

UNITED STATES PATENT OFFICE.

JOHN H. CARR, OF ALHAMBRA, CALIFORNIA.

FLYING-MACHINE.

1,349,942.      Specification of Letters Patent.      Patented Aug. 17, 1920.

Application filed January 3, 1919. Serial No. 270,423.

*To all whom it may concern:*

Be it known that I, JOHN H. CARR, a citizen of the United States, residing at Alhambra, in the county of Los Angeles and State of California, have invented new and useful Improvements in Flying-Machines, of which the following is a specification.

This invention relates to machines for aerial navigation, commonly known as airplanes, but certain features of my invention may be utilized for vehicles used for navigating the land and water with equal success, as hereinafter fully described; the primary object of this invention being to provide a vehicle for air navigation in which the principle employed by birds when sailing or soaring through the air without a motion of their wings is embodied and utilized by means of a practicable adaptation.

A further object of my invention is to provide in a vehicle having air planes for wholly or partially effecting the navigation thereof through space, or on land or water, one or more rearwardly inclined planes with other planes either disposed in horizontal or angular relation thereto and having a connection with the first mentioned planes at the apex of the angle, whereby air pockets may be formed between the angularly disposed planes with openings only at the rear of the space therebetween, so that forwardly moving air currents set up by the movement of the vehicle through space will move into the space between said planes for the purpose of increasing the propulsive force employed for navigating the vehicle. In airplanes of modern types in which one or more planes are employed, these air pockets and the planes by means of which the pockets are formed may be provided as auxiliary attachments to the main planes, for the purpose described.

For purposes of illustration and description I will hereinafter refer to the aforementioned auxiliary planes as deflectors, and in order to properly illustrate my invention I will describe and illustrate only a single embodiment of my invention, another object of which is to provide, preferably at the extreme front end of the vehicle a large deflector plane which is preferably extended at the upper and rear edge and also at the sides beyond the sides of the main planes of the vehicle, with a substantially horizontal or slightly inclined plane leading rearwardly from the forward end of said deflector and a top plane paralleling said bottom plane, and side inclosing planes forming a large air chamber disposed rearwardly of the deflector.

A further object is to provide an airplane having parallel main planes with sides connecting the same and a deflecting plane at the front thereof, and a lifting plane positioned substantially above and to the rear of said deflector so that the air displaced by said deflector may be directed rearwardly into contact with the lower surface of the lifting plane for maintaining a proper balance and sustaining the vehicle during flight.

A still further object of this invention is to provide an airplane having an inclosed air chamber with planes above and below and open at the rear end to admit the currents of air which are displaced by the movement of the vehicle and are returned forwardly to fill the space vacated by the vehicle, due to the pressure of surrounding air, thus assisting in propelling the vehicle through space.

Another object is to provide in an airplane of the character hereinbefore referred to means for guiding the vehicle in its flight and means for supporting a fuselage and motor either between or upon the main planes. Other objects may appear as the description progresses.

Having in mind the objects of invention hereinbefore set forth, I have illustrated in the accompanying drawings forming a part of this invention a single embodiment of my invention, with a preferred form and arrangement of parts and elements of a suitable structure, which will now be described.

In the said drawings:

Figure 1 is a plan of the assembled airplane.

Fig. 2 is a side elevation of the same.

Fig. 3 is a section of the same on the line 3—3 of Fig. 2.

The entire structure for carrying out the objects of my invention is superimposed upon a main and slightly inclined plane 1 having a suitable frame work 2 for reinforcing the plane, and this plane may be slightly narrower at the rear edge than at the front, for practical purposes.

Leading rearwardly from the front edge of the main or bottom plane 1 I provide a rearwardly inclined deflector plane 3 having a frame work 4 and which is substantially wider at its rear edge than the plane 1. A top plane 5 is held in parallel and spaced relation with the bottom plane 1 by means of side inclosing planes 6 which lead rearwardly from the front end of the deflector plane 3 to the rear ends of planes 1 and 5. Rearwardly and outwardly disposed side planes 7 are provided for closing the air spaces between the side planes 6 and the planes 7 and the bottom plane 1 is extended at the sides so as to form bottom surfaces for these spaces.

Thus, the deflecting planes 3 and 7, which enlarge the vehicle at the front end at the top and sides, displace a greater quantity of air and vacate a greater space than the rear portion of the vehicle and the air pockets, or spaces, 8 above the upper surface of the top planes 5 and 9 at the sides of the deflector are positioned exterior of the main body of the vehicle and the forward air currents set up by the flight of the vehicle through space will fill said pockets as the vehicle moves forward, and the pressure of said currents against the deflecting planes will serve to assist in the propulsion of the vehicle.

A fuselage 10 may be built into the frame work of the planes and supported in any suitable manner between the top and bottom main planes 5 and 1, as shown, or, if preferable, supported below the bottom plane 1, though the latter position would to a certain extent defeat the objects of this invention, as it is designed to position all of the elements of a machine as nearly as possible between the main planes so as to reduce the resistance to the air to a minimum.

The fuselage 10 may be extended rearwardly of the planes 1 and 5 for a suitable distance and the rear end thereof may have a rudder 11 and a skid 12 attached thereto in the usual manner adapted to be controlled by suitable means from the main body of the fuselage. A running gear 13 may also be attached to and suspended from the bottom plane 1 for preserving the equilibrium of the vehicle when running on the ground or when alighting after a flight through the air.

A window of glass or other suitable material may be provided in the deflecting plane 3, as at 14, and also other windows 15 may be provided opposite the operator's seat 16 in the side planes 6, as shown in Figs. 1 and 2, so that the operator may observe his movements and control the movement of his machine as thoroughly as in other types of vehicles.

At the forward end of the machine and attached to the front edge of the deflector plane 3 I provide the usual propeller 17 which may be suitably connected with the motor in the fuselage, a pair of elevator planes 18, 18 being pivotally attached to the front edge of the plane 3 for operation from the fuselage, as usual, whereby the inclination of the vehicle during flight may be changed to suit the operator.

A plane 19 is superimposed upon the top plane 5 of the body and is extended at the sides beyond the edges of the planes 1 and 5 preferably, so that the edges thereof will approximately register with the rear edges of the plane 3. This plane 19 is supported on a frame 20 and the forward edge thereof is slightly forward of the junction point of a line extended from the rear edge of the plane 3 and the lower surface of the plane 19, so that the air currents set up by the movement of the vehicle and deflected by the inclined plane 3 will be forced beneath the plane 19 and thence rearwardly, thus preserving a balance for the vehicle and also serving to sustain the vehicle in flight to a large degree. Plane 19 has the form of the planes usually employed in modern air vehicles with the exception that one or more relatively narrow and rearwardly inclined planes of the character of plane 3 are provided above the plane 19 with openings at the rear, as at 21, and these narrow planes form air pockets above the upper surface of the plane 19 and operate in the same manner as the plane 3 at the front of the vehicle.

It will be understood that I have not attempted to show in the drawings or to describe in the specification the complete structure of an air plane but only an arrangement whereby my invention may be embodied in an air vehicle, in order that my newly discovered principle may be described in connection with a sufficient disclosure of a structure so that those skilled in the art may understand the application of my principle to airplanes.

It will be understood that the top plane 5 may, in some cases be omitted and the plane 19 substantially lowered, the sides 6 being also omitted and the deflector plane at the front being substantially shortened and the angle thereof being changed to correspond to the elevation of the top plane 19. In such case the action of the forward air currents against the deflector plane will be the same as in the form of device shown, to all intents and purposes, but with possibly modified results. One object of the side planes 6 is to provide protection against the elements when the machine is in flight. Also, as shown, the forward portion of the plane 19 may be bent at an angle upwardly from the rear portion thereof and the plane 21 leading from the forward edge thereof rearwardly, so as to as far as possible provide against a downward thrust of the vehicle, due to the force of the air currents between the planes 19 and 21.

Other elements of my device may be changed within the limits of the appended claims without departing from the spirit of my invention or enlarging the scope thereof.

What I claim is:

1. An airplane having main planes for sustaining the vehicle in flight, diagonally disposed side planes extending rearwardly from the front thereof and an inclined plane connecting said main and side planes, as described.

2. An airplane having sustaining planes substantially horizontally disposed, a rearwardly inclined plane joined to said sustaining planes at their front edges, main side planes connecting said sustaining planes and auxiliary diagonally disposed side planes connecting said sustaining planes and said main side planes, as described.

3. In a vehicle, main top and bottom planes supported thereon, and a rearwardly inclined converging plane attached thereto at the front and forming a pocket between said main planes open at the rear and having converging sides for admitting the air during the movement of the vehicle.

4. In a vehicle, a main supporting plane, a rearwardly inclined plane joining said main plane at the front edge and spaced therefrom at the rear edge, side planes closing the ends of the space between said main plane and said inclined plane and disposed in converging position for forming an air space between said inclined, main and side planes open only at the rear.

5. In an airplane, spaced top and bottom main planes having sides closing the space therebetween, an inclined plane forming a front closure for said space, and a fuselage supported on said bottom main planes.

6. In an airplane, spaced main planes having sides closing the space therebetween, an inclined plane forming a front closure for said space and extended beyond said main planes at the sides, said space being open at the rear to admit air currents thereinto.

7. In an airplane, spaced main planes, an inclined plane at the front thereof and extended rearwardly from the uppermost of said main planes, and a lifting plane spaced from said upper plane and positioned substantially rearwardly of said inclined plane.

8. In an airplane having spaced main planes, side planes connecting said main planes, and a deflecting plane angularly disposed relative to and connected with said main planes at the front and extended therebeyond at the sides, whereby during flight, a space of greater area than the area of said main planes will be vacated, for the purpose set forth.

9. An airplane having spaced main planes, converging side planes connecting said main planes, and an enlarged deflecting plane disposed in converging relation to said main planes and having its side edges diverging therefrom, for the purpose set forth.

10. An airplane having spaced main planes closed at the sides and forming an air receiving space therebetween, a rearwardly inclined plane connecting said main planes at the front and rearwardly diverging planes at the sides, for the purpose set forth.

11. An airplane having a main plane, an inclined plane connected therewith for forming an air space adjacent thereto open at one side, and rearwardly diverging planes forward of said air space for deflecting air currents set up by the flight of the vehicle laterally of the vehicle.

12. An airplane comprising a main plane supported in substantially horizontal position, a converging plane connected therewith at one edge and having its side edges diverging therefrom, and end closures for the space between said planes, for forming air spaces therebetween, open at the rear for admitting air currents during the flight of the vehicle.

13. An airplane comprising substantially horizontal and parallel main planes spaced apart, side members connecting said planes, a forward deflecting plane inclined relative to and attached to said main planes and extended therefrom at the top and sides, and a sustaining plane spaced from said main planes and positioned rearwardly of said deflecting plane.

14. An airplane having spaced main planes closed at the sides and front, a sustaining plane supported thereabove, air spaces being formed between said main planes and above said sustaining plane, and means for guiding the vehicle in flight.

15. An airplane having spaced main planes for sustaining the vehicle in flight, and an inclined plane positioned forwardly of said main planes and joined at its front edge to the lower plane and near its rear edge to the upper plane, whereby air currents set up by the vehicle in flight may be directed between said main planes.

JOHN H. CARR.

Witnesses:
WILLIAM DAUNER,
BESSIE BOWATER.